Figure 1:
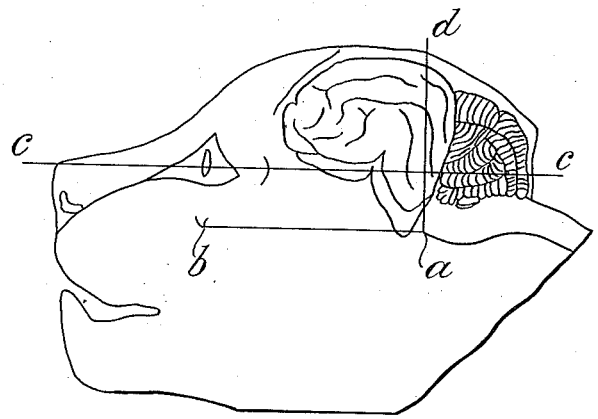

R. H. CLARKE.
SURGICAL APPARATUS.
APPLICATION FILED JULY 17, 1913.

1,093,112.

Patented Apr. 14, 1914.
9 SHEETS—SHEET 1.

WITNESSES:

INVENTOR
Robert H. Clarke
BY
ATTORNEYS

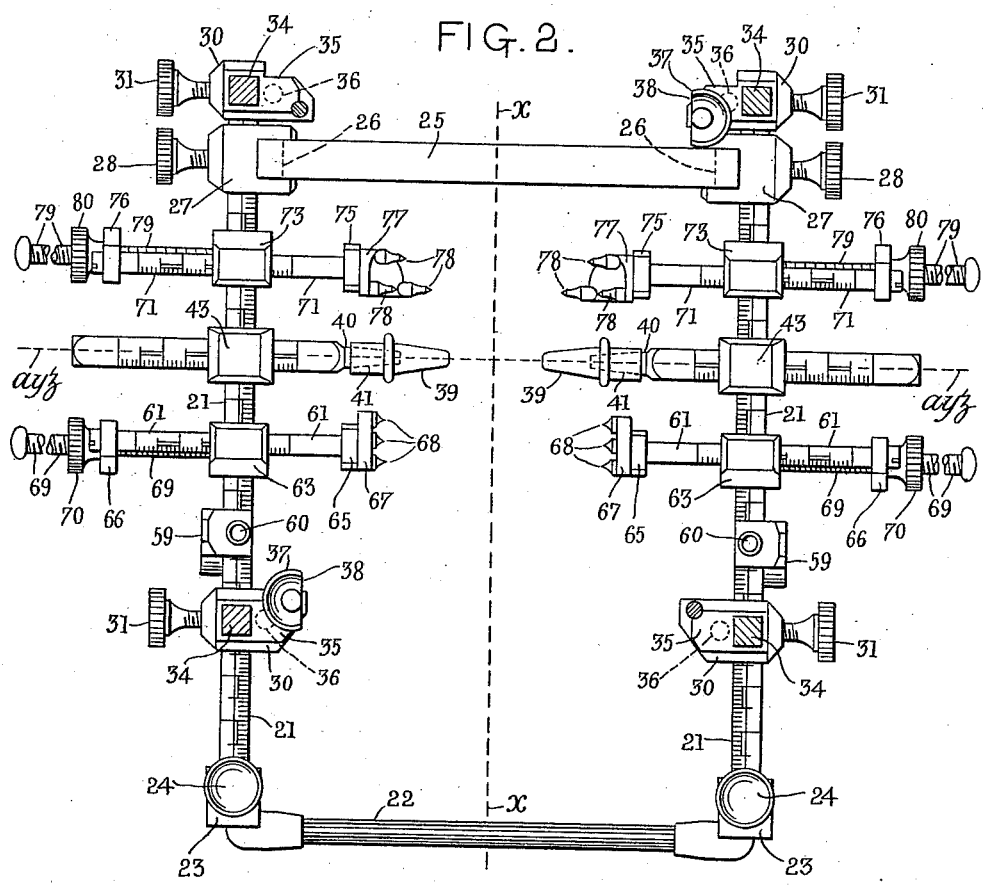

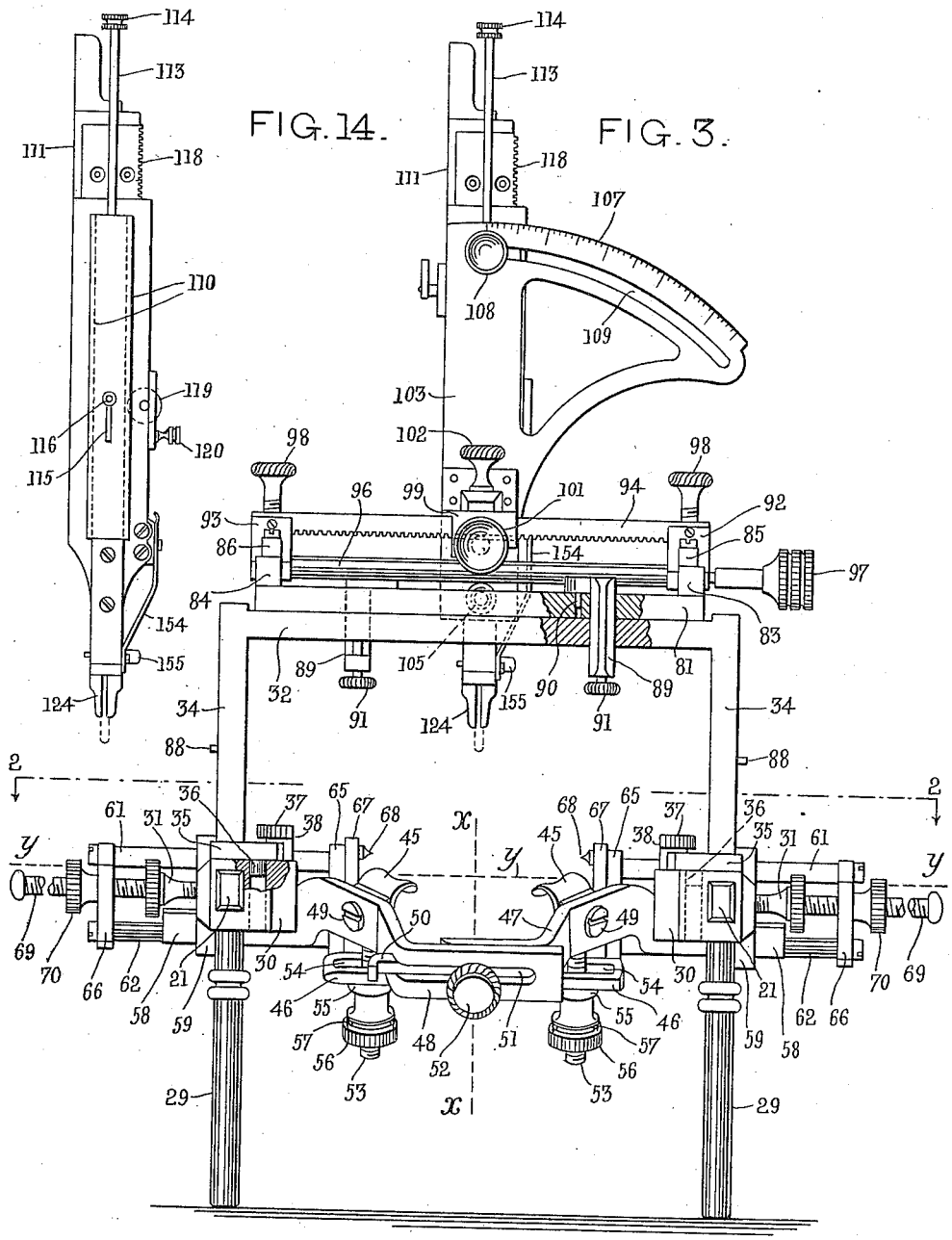

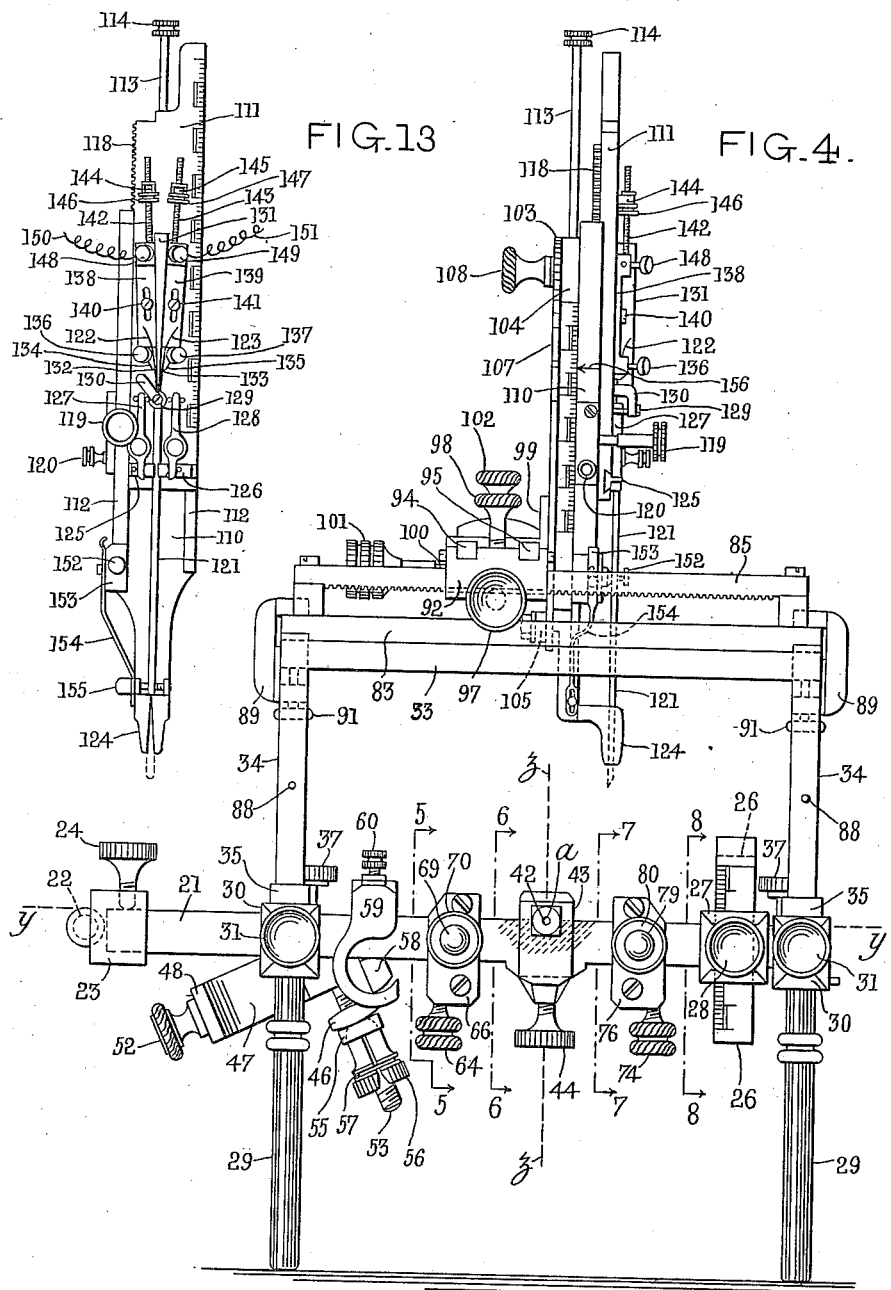

R. H. CLARKE.
SURGICAL APPARATUS.
APPLICATION FILED JULY 17, 1913.
1,093,112.
Patented Apr. 14, 1914.
9 SHEETS—SHEET 5.
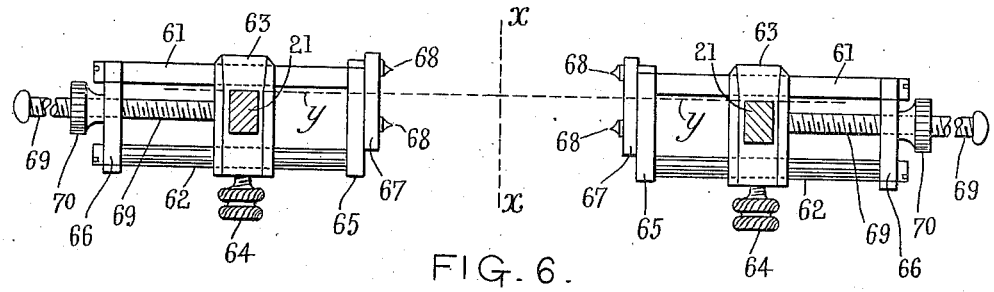
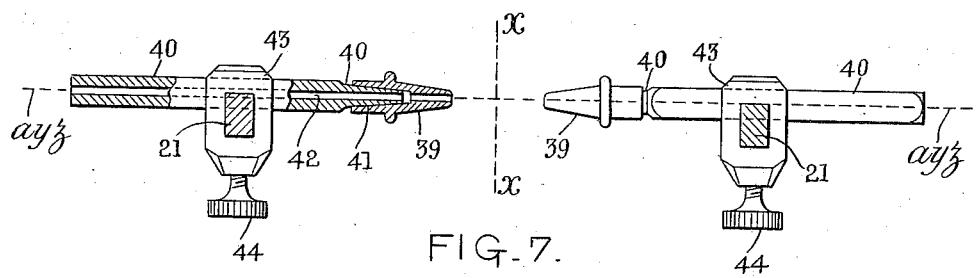
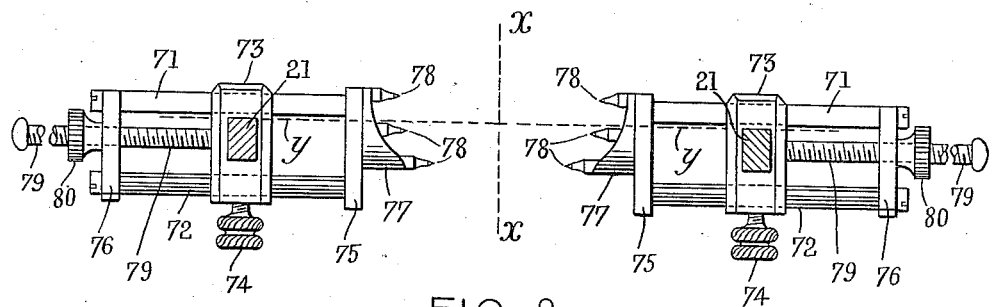
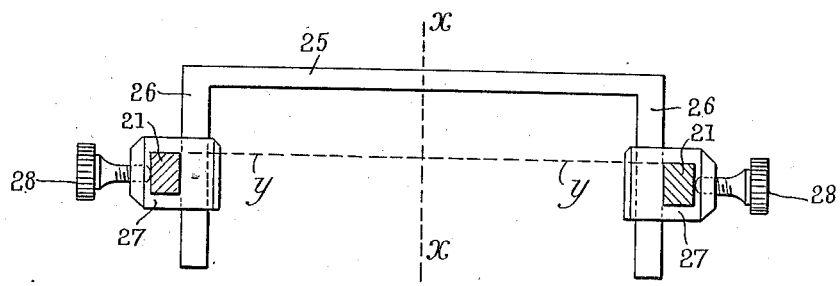
WITNESSES:
G. V. Rasmussen
George Du Bois
INVENTOR
Robert H. Clarke
BY
Briesen & Knauth
ATTORNEYS R. H. CLARKE.
SURGICAL APPARATUS.
APPLICATION FILED JULY 17, 1913.
1,093,112.
Patented Apr. 14, 1914.
9 SHEETS—SHEET 6.
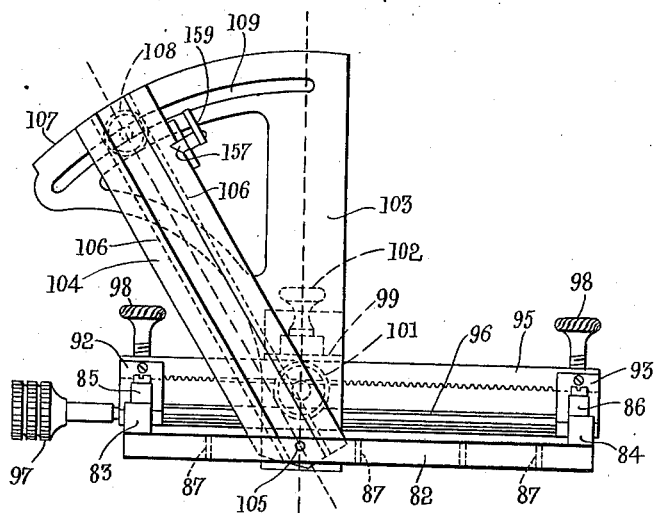
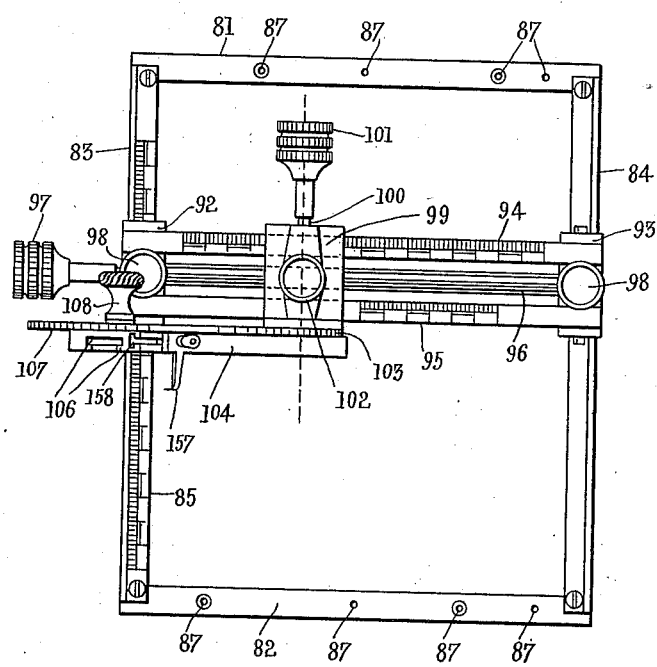
WITNESSES:
INVENTOR
Robert H. Clarke
BY
Briesen & Knauth
ATTORNEYS

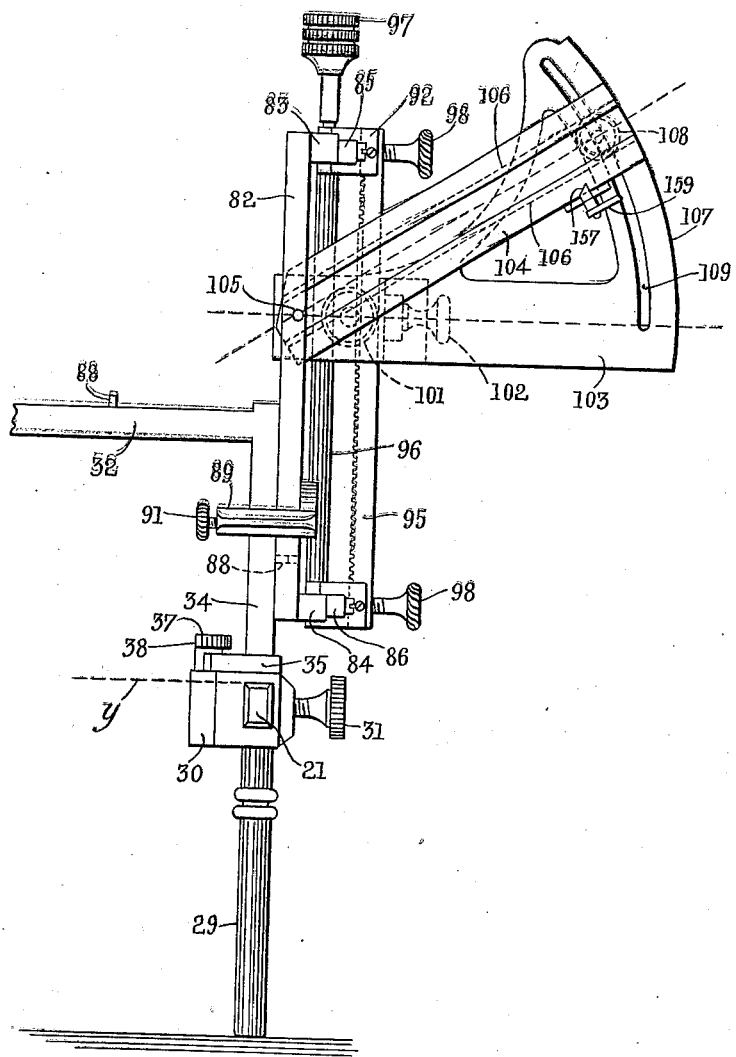

R. H. CLARKE.
SURGICAL APPARATUS.
APPLICATION FILED JULY 17, 1913.
1,093,112.
Patented Apr. 14, 1914.
9 SHEETS—SHEET 8.
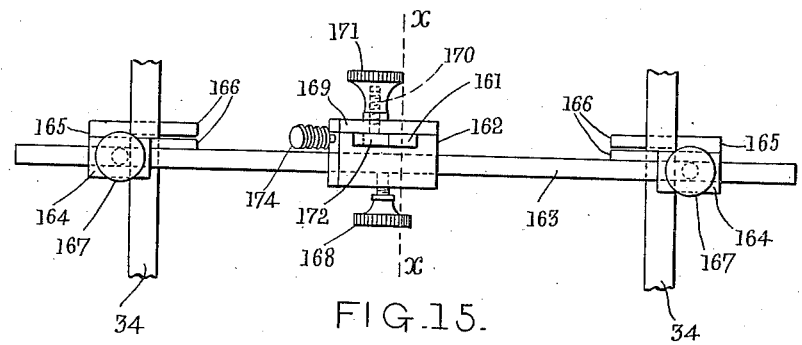
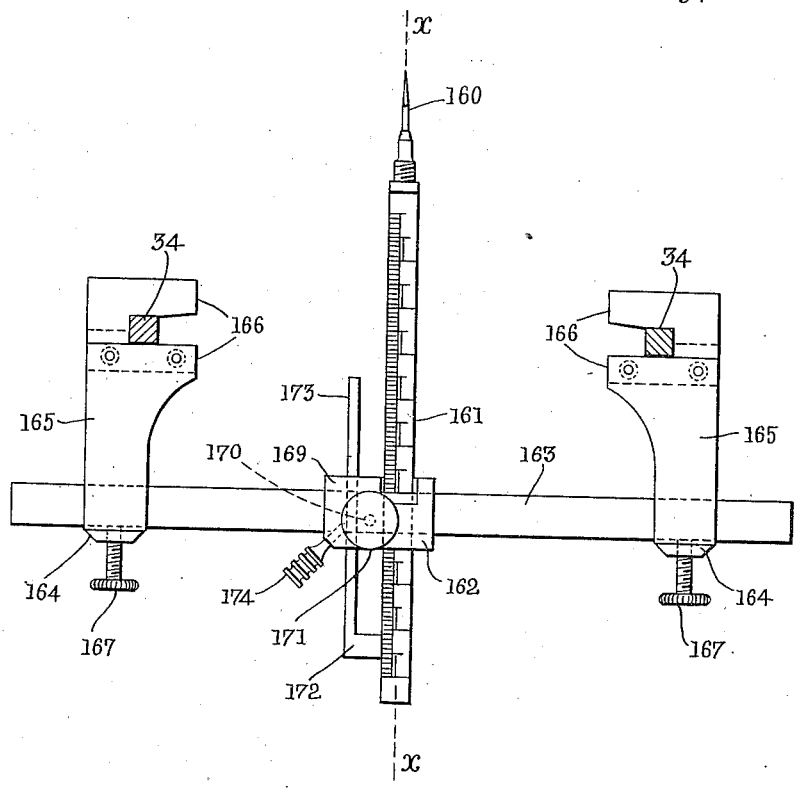
WITNESSES:
INVENTOR
Robert H. Clarke
BY
Briesen & Knauth
ATTORNEYS

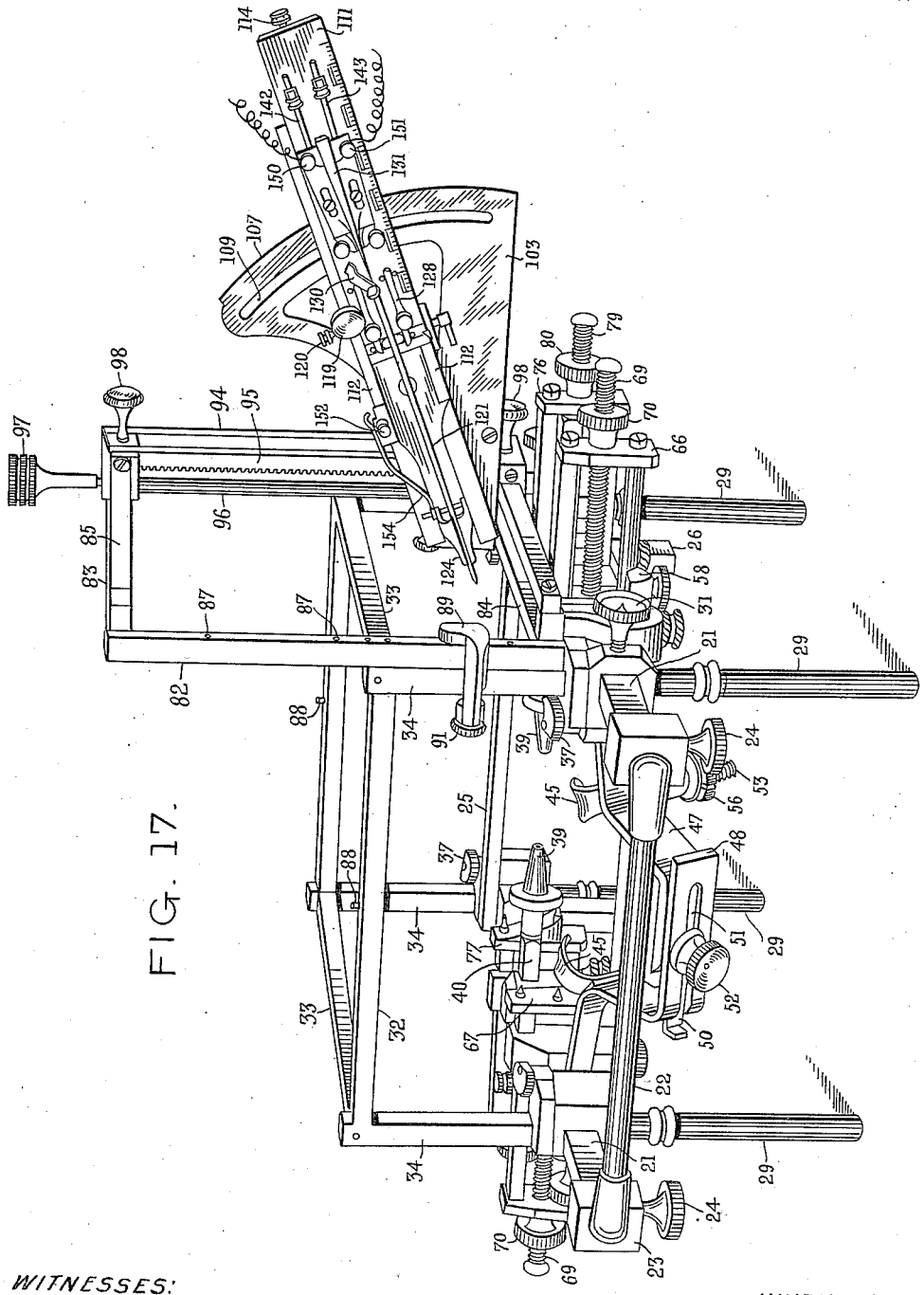

UNITED STATES PATENT OFFICE.

ROBERT HENRY CLARKE, OF WARLINGHAM, ENGLAND.

SURGICAL APPARATUS.

1,093,112. Specification of Letters Patent. Patented Apr. 14, 1914.

Application filed July 17, 1913. Serial No. 779,453.

*To all whom it may concern:*

Be it known that I, ROBERT HENRY CLARKE, a subject of the King of Great Britain, and resident of "Oakfield," Warlingham, in the county of Surrey, England, surgeon, have invented a certain new and useful Surgical Apparatus for Use in Performing Operations Within the Cranium, of which the following is a specification.

This invention relates to what may be termed stereotaxic surgical apparatus for use in performing operations within the cranium of living human beings or animals or for anatomical research, and is designed to enable a so-called probe (*i. e.* a needle-like, longitudinally-slidable instrument, serving as the means of carrying and controlling the actual operative device) to reach, with absolute precision and by the shortest path, any predetermined point within the cranium through a comparatively small opening formed in the wall of the latter, the primary object of the invention being to obviate the necessity of extensively laying open or partially dissecting the head and removing considerable portions of the cranium contents in order to gain access to the exact spot whereat the actual operation is required to be carried out.

The use of the apparatus of the present invention implies previous gaging of the position of the predetermined intra-cranial point—with concurrent reference to three mutually-perpendicular assumed planes (hereinafter termed "zero-planes") which intersect one another within the cranium; the positions of these zero-planes being fixed relatively to certain anatomical features which themselves have, in all generically similar specimens, a substantially constant position with reference to the cranium and its contents. The determination of the position of the intra-cranial point is effected with the aid of charts (obtained from sections of anatomical specimens) of three mutually-interpenetrating series of lamellæ, of uniform unit-thickness, into which the cranium with its contents is conceived of as divided for the purpose of the invention, and to which the zero-planes just referred to are respectively regarded as parallel. It will be evident that while the charts just mentioned should exhibit standard (or assumed standard) forms of those crania, with their contents, to which any particular set of charts relate, the actual cranium to be treated may or may not conform in all respects to the standard, but may differ therefrom not only in respect of absolute dimensions but also as regards the ratio between any two diameters or similar leading measurements. Now, the existence of any such difference implies a difference of scale between the thicknesses of the corresponding lamellæ in the standard and in the actual cranium respectively, the number of lamellæ in any one of the three sets being understood as remaining constant whatever the scale. Hence, the ordinates determining the position of the required intra-cranial point with reference to the respective zero-planes of the cranium must directly agree, as regards their relative scales, not with the standard scales to which the charts are drawn, but with scales corresponding to the actual dimensions found existing in the cranium under treatment itself. A simple device is described hereinafter for gaging the dimensions of the cranium under treatment, from which dimensions the actual distance of the predetermined point from each of the zero-planes of the cranium may be deduced by means of suitable proportional scales.

As regards the general character of the instrument and the method of employing it, it is to be understood that there is erected, about the cranium to be operated upon, an open frame of approximately (and so-called) cubical form whose virtual bounding-planes are adjusted parallel to the actual or virtual positions of the respective zero-planes of the cranium, this cubical frame serving as the support for a rectangular stage capable of being fixed upon each side of the frame in turn according to requirements. The stage constitutes the stationary base of a compound slide-rest comprising an upper and a lower member conjointly affording means for the rectilinear adjustment of the so-called probe (previously mentioned) in two directions at right angles to one another in a plane parallel to that virtual bounding-plane of the cubical frame which is represented by the side of the frame to which the stage is for the time being fixed. The probe is mounted upon the upper member of the compound slide-rest through the medium of a so-called "pillar" which may be made rotatable about an axis perpendicular to the plane in which the members of the slide-rest are movable; the probe being adjustable lengthwise of its own axis in a socket pivoted to swing about an axis parallel to said plane, and at any predetermined or adjustable distance therefrom, so that the probe has provision for a compound angular adjustment relatively to the slide-rest, in addition to its capability of movement lengthwise of its own axis. It will now be seen that if (the stage having been fixed to one side of the cubical frame) the appropriate rectilinear adjustments be effected in the case of the respective members of the slide rest, and the appropriate angular adjustments be also effected in the case of the probe-socket, so that the axis of the probe points (at any desired inclination to one or more of the zero-planes) directly toward the predetermined point within the cranium, the probe may thereupon, by a single movement lengthwise of its own axis, be projected the necessary distance through its socket until its extremity is brought into coincidence with the required intra-cranial point. This simple rectilinear movement of the probe permits of its being made to pass through a small opening formed in the wall of the cranium by the well-known operation of trephining. Any one of the adjustments mentioned above may be made permanent and fixed, if this be found convenient; and, in the example illustrated in the drawings, certain of said adjustments are shown thus fixed, as will appear hereinafter.

For the purpose of the present invention it has been found most convenient to employ, as the respective zero-planes of the cranium, the median sagittal plane (i. e. the median vertical longitudinal plane), a so-called frontal plane, and a so-called horizontal plane; the positions of the two latter, which intersect the sagittal zero-plane and one another at right angles, being determined as follows: The horizontal zero-plane coincides with, or is parallel to, that plane in which lies the so-called inter-aural axis (i. e. the transverse line joining the centers of the auditory meatus at opposite sides) and which also touches the lowest point of the lower margin of the orbit at each side; while the frontal zero-plane is that transverse plane wherein lies the inter-aural axis and which is also perpendicular to the horizontal zero-plane. The center of the auditory meatus at each side is determined by the insertion of a cone therein. It is to be observed that, as the inter-aural axis lies almost entirely below the brain, it is in practice usually preferable to employ, as the horizontal zero-plane, a plane parallel to the horizontal plane wherein said axis lies and at such a distance above it as to afford the advantage of measurements from both sides of the horizontal zero-plane. For the purpose of the present description, however, it will be most convenient to regard, as the horizontal zero-plane, the so-called basal plane wherein lie the inter-aural axis and the lowest points of the orbits, as above described.

To facilitate the comprehension of the use of my instrument I have illustrated in Figure 1 of the accompanying drawings a diagrammatic side view of the head of a cat (the head being shown partly in section on the median sagittal plane or sagittal zero-plane), and in Figs. 2 to 17 inclusive a convenient form of the instrument as designed more particularly for use in experimental operations on the crania of cats and similar animals. Fig. 2 is a sectional plan view of the instrument on line 2—2 of Fig. 3; Fig. 3 is a front elevation, partly in section (the stage with the parts carried thereby being shown mounted on top of the cubical frame); and Fig. 4 is a side elevation corresponding to Figs. 2 and 3. Figs. 5, 6, 7, and 8 are sections of the instrument taken respectively on lines 5—5, 6—6, 7—7 and 8—8 of Fig. 4; Fig. 5 showing the pair of anterior head-cramps, Fig. 6 the pair of ear-cones whereof one is partly in axial section, Fig. 7 the pair of posterior head-cramps and Fig. 8 the so-called occipital bar. Fig. 9 is a plan view of a so-called mask or bridle. Figs. 10 and 11 are respectively a plan view and a front elevation of the stage, with the compound slide-rest, the pillar, and the probe-socket. Fig. 12 is a part front elevation of the cubical frame, showing the stage (with the other parts illustrated in Figs. 10 and 11) mounted on one side of the frame. Fig. 13 is a front elevation and Fig. 14 a rear elevation of one form of probe (with its carrier) designed for use in producing electrolytic lesions within the brain. Figs. 15 and 16 are respectively a plan view and an end elevation of a gage for use in determining the leading external dimensions of the cranium under treatment. Fig. 17 is a perspective general view of the instrument as shown in Figs. 2 to 14.

Referring to Fig. 1, which shows the cat's head as viewed from the left side, $a$ represents the position of the inter-aural axis and $b$ the lowest point of the lower margin of the left orbit; consequently the line joining the points $a$ and $b$ represents in Fig. 1 the position of the basal plane which, for the purpose of the present description, is regarded as the so-called horizontal zero-plane. (For practical purposes, however, it is usually preferable to employ as the horizontal zero-plane a plane represented by the line $c$—$c$ extending parallel to the basal plane at such a distance above the latter as to intersect the orbits centrally.) The frontal zero-plane is represented in Fig. 1 by the line $a$—$d$ drawn through the inter-aural axis $a$ perpendicular to the horizontal zero-plane a—b. The sagittal zero-plane, being parallel to the plane of the drawing, is not represented in Fig. 1 by any line. As regards the relation between the parts of the instrument and the respective zero-planes, the position of the sagittal zero-plane is indicated by the line x—x in Figs. 2 and 3, and in Figs. 5-9 inclusive. The position of the horizontal zero-plane is indicated by the line y—y in Figs. 3 to 8 inclusive and in Fig. 12. The position of the frontal zero-plane is indicated by the line z—z in Figs. 2, 4 and 6. As the inter-aural axis lies in both the horizontal and frontal zero-planes, it is indicated in Figs. 2 and 6 by the conjunction of the three corresponding letters, being represented therein by the line ayz—ayz. The position of the inter-aural axis is represented in Fig. 4 by the single letter a, this figure corresponding to Fig. 1 as regards the point of view.

Dealing now with the construction of the instrument as illustrated in Figs. 2 to 16, the so-called cubical frame comprises two main portions, namely a lower portion or so-called head-vise which, with its various adjuncts, serves for adjusting and holding the cranium with its assumed zero-planes, and the instrument as a whole, in the required position relatively to one another, and an upper portion or so-called cage which is planted upon the head-vise and serves as the support to which the stage already mentioned may be applied in various positions according to circumstances. The head-vise, which constitutes a substantially rectangular horizontal frame, comprises a pair of lateral members for supporting the head-cramps and ear-cones, and front and rear transverse members whose primary function is to brace the lateral members securely together. The lateral members consist of a pair of straight horizontal parallel bars 21, 21 (Fig. 2) of rectangular cross-section, while the front transverse member is a straight horizontal bar 22, preferably of circular cross-section and provided at its ends with sockets 23 which fit over the corresponding extremities of the lateral bars 21 and are removably clamped thereto by means of set-screws 24. The rear transverse member is hereinafter referred to as the "occipital bar" and (for a purpose hereafter explained) is made adjustable both lengthwise of the lateral bars 21 and also at right angles thereto. The occipital bar is a straight horizontal bar 25 of rectangular cross-section throughout, its ends 26 being directed vertically downward (see Fig. 8) so as to be vertically adjustable in socket-pieces 27 which are themselves adjustable lengthwise of the respective lateral bars 21. The vertical and horizontal holes in each socket-piece 27 intersect one another so far as to allow the outer surfaces of the vertical ends 26 of the bar 25 to contact with the inner surfaces of the respective lateral bars 21, a single set-screw 28 carried by each socket-piece consequently serving not only to clamp the socket-piece itself to the corresponding lateral bar, but also to clamp the adjacent end 26 of the bar 25 in the socket-piece.

The head-vise is provided with four legs 29 for convenience in setting-up the instrument, these legs being made adjustable upon the head-vise to facilitate fitting. For this purpose each leg is fixed to a socket-piece 30, which is slidable on the corresponding lateral bar 21 and clamped thereto by means of a set-screw 31. Normally, the rear legs are most conveniently placed outside the occipital bar 25, while the front legs are placed inwardly of the front cross-bar 22. The socket-pieces 30 for the legs serve also for the attachment of the cage to the head-vise, as hereafter explained.

The cage comprises a horizontal rectangular (preferably square) top-frame having at each corner a vertical post adapted for attachment to the corresponding socket-piece 30, the members of the frame and the corner-posts being permanently fixed together so as to be applicable to, and detachable from, the head-vise as an integral whole. The horizontal top-frame (Figs. 3 and 4) consists of a pair of front and rear members 32 and a pair of lateral members 33, these and the four corner-posts 34 being all of rectangular cross-section and of equal cross-sectional dimensions. Each corner-post 34 has a foot-piece 35 adapted to rest on the corresponding socket-piece 30; a pintle or dowel-pin 36 (Fig. 3) which projects beneath the foot-piece being adapted to fit into a corresponding vertical hole provided in the socket-piece 30. For the purpose of holding the cage securely in position, each socket-piece 30 carries a vertical clamping-screw the under-surface of whose milled-head 37 is adapted to engage over the corresponding foot-piece 35 (see Fig. 3); each milled-head being partially cut away as indicated at 38 (Fig. 2) so as to permit of the cage being removed from the head-vise without the necessity of completely withdrawing the clamping-screws themselves.

The position of the cranium relatively to the instrument is primarily determined by means of a pair of ear-cones carried by the head-vise, the position of these ear-cones lengthwise of the lateral bars 21 being preferably, as in the construction illustrated, permanently fixed, whereas the ear-cones themselves (shown at 39 in Figs. 2 and 6) as well as their distance apart, can be changed to suit the requirements of the subject under treatment. Each ear-cone 39 constitutes a detachable ferrule on the inner end of a stem 40, the inner or operative end of the cone itself being adapted to fit firmly within the auditory meatus while the outer end presents a conical socket adapted to fit securely over the correspondingly tapered inner extremity of the stem, as shown at 41 at the left side of Fig. 6. Preferably, the stem 40 and ear-cone 39 both have an axial bore 42 which serves for directing the drill used in preparing anatomical specimens by drilling a hole to represent the inter-aural axis $a$, which in any case coincides with the axis of the bore 42 as indicated in Figs. 4 and 6. Each stem 40 is of rectangular cross-section externally, and is adjustable in the direction of its own length (*i. e.* transversely of the cubical frame) through a notch provided for its reception in the upper surface of the corresponding lateral bar 21; the axes of the two stems 40, which are in mutual alinement, being on a level with the upper surfaces of the lateral bars 21, so as to extend in the horizontal zero-plane, while the position of the common axis of both stems, lengthwise of the lateral bars 21, is central with reference to the length of the cage. For the purpose of securing the stems 40 in position, each passes through a stirrup 43 which embraces the stem and lateral bar 21 where these cross one another, the two openings provided for this purpose in each stirrup intersecting one another so that, on the stirrup being drawn downward by means of a set-screw 44, the stem 40 and stirrup 43 will be clamped tightly together and also to the corresponding lateral bar 21. When the ear-cones 39 have been inserted in the auditory meatus, the cranium and the instrument as a whole are capable of rocking relatively to one another about the inter-aural axis represented by the common axis of the two cones. In order to prevent this, and to insure that the horizontal zero-plane of the cranium shall be retained in permanent coincidence with the horizontal zero-plane of the instrument (*i. e.* in the plane wherein lie the upper surfaces of the two lateral bars 21), the position of the face of the subject is fixed relatively to the instrument by means of a so-called mask or bridle attached to the lateral bars 21. The bridle carries a pair of hooks 45 adapted for insertion in the respective orbits so as to bear downward upon the latter in such manner as to bring the lowest point of the lower margin of each orbit into the horizontal zero-plane of the instrument, while a bit 46, also carried by the bridle and adapted for insertion between the jaws, serves to prevent depression of the orbits below the level determined by the orbital hooks 45. The bridle itself comprises a pair of lateral members or cheek-pieces 47, 48, to each of which one of the orbital hooks 45 is permanently fixed by means of a screw 49, these hooks being of a size, and set to an angle with reference to the sagittal plane $x—x$ (see Fig. 9), appropriate to the cranium under treatment. The cheek-pieces 47, 48, are adjustable in the lateral direction relatively to one another to suit the width of the cranium and face of the subject; for which purpose they overlap one another in front, the one cheek-piece 47 having a tongue 50 fitted to slide through a slot 51 in the other cheek-piece 48, while a set-screw 52 carried by and passing through the slot 51 serves for clamping the two cheek-pieces firmly together after adjustment.

The mouth-bit 46 consists of a horizontal cross-bar of flattened oval cross-section, and is supported at the requisite distance below the lever of the orbital hooks 45 by means of a pair of threaded side-rods 53 depending from the respective cheek-pieces, these rods passing through slots 54 extending lengthwise of the bit near its ends. Each rod 53 carries, beneath the bit 46, a washer 55 having at its underside a conical recess into which fits the tapered upper end of a split nut 56 adapted both to slide and to screw upon the rod; the halves of the nut being loosely held together by a hoop of wire embracing the nut as indicated at 57. In fixing the bit 46 in the mouth, the nuts 56 are pushed upward along the rods 53 so as to raise the bit into contact with the upper jaw of the subject, whereupon the engagement of the tapered upper ends of the nuts with the conical recesses of their respective washers 55 causes the nuts to engage with the threads upon the rods 53, thus enabling the nuts to be screwed home so as to lock the bit in position.

The outer ends of the cheek-pieces 47, 48, are provided with trunnions in the form of lateral prolongations 58 whereby the bridle is attached to the lateral bars 21, these trunnions, which extend transversely in alinement with one another, being clamped against the under sides of the respective lateral bars by means of a pair of hooked brackets 59 which engage beneath the trunnions and bear down upon the upper surfaces of the bars 21 through the medium of set-screws 60. As indicated in Fig. 4, the hooks of the brackets 59 are so shaped as to allow of the trunnions 58 turning to some extent about their common axis so as to permit the bit 46 to adjust itself to the mouth of the subject, the upper surface of each trunnion being also made convex in cross-section for the same purpose.

The ear-cones and bridle serve for adjusting the positions of the cranium and instrument relatively to one another, but for the purpose of rendering the adjustment secure, it is found advisable to employ in addition two pairs of head-cramps, anterior and posterior respectively, which are carried by the lateral bars 21 and serve to grip the head from opposite sides in front of and behind the ears respectively. Both pairs of cramps are seen clearly in plan view in Fig. 2, the anterior pair being shown separately in Fig. 5 and the posterior pair in Fig. 7, in each case in front elevation. The head-cramps are similar to one another in general construction, differing only in respect of the parts which contact immediately with the head. Each member of the anterior pair consists of a laterally adjustable frame comprising upper and lower horizontal slide-bars 61, 62 which are respectively of rectangular and circular cross-section and are adjustable transversely of the corresponding lateral bar 21 (above and below its upper and lower surfaces respectively) through a guide-block 63 which is adjustable lengthwise of said bar and is adapted to be clamped thereon by means of a set-screw 64, the inner and outer ends of the slide-bars being connected by plates 65, 66, respectively. The inner end-plate 66 carries a jaw 67 provided with sharply-pointed studs 68 adapted to pierce the skin and take a firm grip on the surface of the bone, three such studs being shown in the example illustrated. Each cramp of the pair can be caused to engage the head by simply sliding the bars 61, 62 through the guide-block 63, the grip being thereafter rendered secure by means of a screw-adjustment. For this purpose a threaded horizontal rod 69, fixed by its inner end to the guide-block 63, extends outward between the slide-rods 61, 62 so as to pass through a hole in the outer plate 66, against whose outer face bears a nut 70 which is carried by the threaded rod 69. By screwing the nut 70 inward, the studs 68 can be forced through the skin and caused to grip the bone securely. Preferably the screw-thread of the rod 69 and nut 70 is made of quick pitch so as to obviate delay in effecting the adjustment, while the outer end of the screwed rod 69 is provided with a knob or otherwise adapted to prevent the nut 70 being completely withdrawn from the rod. Each member of the posterior pair of head-cramps has identically the same construction so far as above described, the several parts 61 ... 70 of the anterior pair being reproduced in corresponding parts 71 ... 80 of the posterior pair, which therefore requires no further description. The two pairs of head-cramps differ from one another only as regards the form of the jaws 67 and 77, which are respectively made to suit the configuration of those parts of the head to which they are applied. Thus, in the example illustrated, the inner surfaces of the anterior jaws 67 extend in vertical longitudinal planes, and are each furnished with three pointed studs 68 of equal length, so as to be adapted to grip the approximately flat cheek-bones in front of the ears, while the inner surfaces of the posterior jaws 77 are oblique in two directions with reference to the sagittal zero-plane, being slightly convergent rearward as indicated in Fig. 2, and more convergent downward as shown in Fig. 7. When, the position of the cranium and of the instrument as a whole relatively to one another having been determined by means of the ear-cones and bridle, the head has been firmly fixed by means of the two pairs of cramps, the occipital bar 25 may (if desired) be brought into contact with the back of the head and there fixed as a still further means of security, the socket-pieces 27 being for this purpose adjusted lengthwise of the lateral bars 21 and the occipital bar itself being raised or depressed as may be found necessary.

In order to facilitate accurate adjustment of the various movable parts of the head-vise, each lateral bar 21 is graduated longitudinally (see Fig. 2) in opposite directions from the center of its length, with which (as already stated) the axis of the corresponding ear-cone 39 and stem 40 coincides, so that in the case of the brackets 59 of the bridle, the guide-blocks 63 and 73 of the head-cramps, and the socket-pieces 27 of the occipital bar, the members of a pair may be set accurately opposite to one another. The stems 40, the upper slide-bars 61, 71 of the head-cramps, and the trunnions 58 of the bridle, are all graduated longitudinally (see Fig. 2), so as to enable the cranium to be adjusted with its median sagittal plane coincident with the central vertical longitudinal plane of the instrument. In addition, the cheek-pieces 47, 48 of the bridle (or one of them) may be graduated longitudinally as indicated in Fig. 9, while the vertical ends 26 of the occipital bar are graduated (see Fig. 4) to enable the occipital bar 25 itself to be accurately leveled.

The stage forming the base for the compound slide-rest which carries the pillar and the socket-guide for the probe, is a rectangular (preferably square) frame adapted for application to the top or to any side of the cage at will, as may be deemed advisable in view of the operation to be performed; the stage being capable of being orientated with reference to the top of the cage in either of four different directions, and similarly (if desired) with reference to each side of the cage, although so large a choice of positions in this last-named respect would seldom be found necessary in practice. The stage comprises a pair of front and rear bars 81, 82 (Fig. 10) connected by a pair of side-bars 83, 84, all of rectangular cross-section. Assuming all these to be horizontal, a pair of stationary rack-bars 85, 86 extend above and parallel to the side-bars 83, 84, and also parallel to one another, so as to form guides for the lower member of the compound slide-rest; both rack-bars being toothed on the under-side, while one of them 85 (or it might be both) is graduated as indicated. The dimensions of the stage are such as to enable it to fit snugly upon the cage, in whichever direction it is applied to the latter, as exemplified in Figs. 3 and 4 (which show the stage applied to the top of the cage) and in Figs. 12 and 17 (which show it applied to one side of the cage). To insure accurate positioning, the bars 81, 82 of the stage are shown as having dowel-holes 87 into which fit dowel-pins 88 fixed in corresponding positions on the top frame and corner posts of the cage; while in order to hold the stage firmly upon the cage, there are provided a pair of U-shaped screw-clamps 89, each of which has at one end a pin 90 adapted to fit into a hole in one of the bars 81, 82 and at the other end a set-screw 91 whereby to enable the stage and cage to be drawn tightly together.

The lower member of the compound slide-rest comprises a pair of end-carriages 92, 93 fitted to slide upon the respective rack-bars 85, 86 of the stage, these end-carriages being connected by a pair of rack-bars 94, 95, which extend parallel to the front and rear bars 81, 82 of the stage and form guides for the upper member of the slide-rest. The lower member of the slide-rest is moved to and fro by means of rack-and-pinion gearing comprising a shaft 96 journaled in bearings in the end-carriages and provided at one end with a milled-head 97 whereby it may be rotated, the shaft 96 carrying toothed pinions which gear with teeth on the under sides of the respective rack-bars 85, 86 of the stage. The end-carriages 92, 93 embrace these rack-bars so that, by means of a pair of set-screws 98, the lower member of the slide-rest may, after adjustment, be securely clamped in position on the stage.

The upper member of the compound slide-rest consists of a carriage 99 fitted to slide upon the rack-bars 94, 95 of the lower member and moved to and fro by rack-and-pinion gearing comprising a shaft 100 journaled in bearings in the carriage and provided at one end with a milled-head 101 whereby it may be rotated, the shaft 100 carrying toothed pinions which gear with teeth on the under sides of the respective rack-bars 94, 95. The carriage 99 embraces these rack-bars so that, by means of a set-screw 102, the upper member of the slide-rest may, after adjustment, be securely clamped in position on the lower member.

The pillar 103 is mounted on the carriage 99 so as to extend in a direction perpendicular to the planes in which the two members of the compound slide-rest are movable. The pillar, in the example illustrated, is shown as fixed to the carriage 99, but it might obviously be made angularly adjustable about an axis parallel to the direction in which the pillar itself extends, as previously mentioned. To the lower end of the pillar 103 a grooved guide-socket 104 is pivoted to swing about an axis 105, which, in the example illustrated, is fixed parallel to the direction of motion of the lower member of the compound slide-rest, so that the socket 104 is rotatable in a plane parallel to the plane of motion of the carriage 99. The parallel guides 106 on the socket 104 extend radially of the axis 105, the inclination at which these guides are adjusted being determined with the aid of a graduated arc 107 (Figs. 3, 11 and 12) carried by the pillar, while the guide-socket, after adjustment, is clamped to the arc 107 by means of a set-screw 108 carried by the guide and traveling in a segmental slot 109 provided in the arc 107. It will be obvious that the position of the axis 105 might (as previously mentioned) be made adjustable lengthwise of the pillar 103, that is to say, in a direction perpendicular to the planes of motion of the two members of the compound slide-rest; the guide-socket 104 and graduated arc 107 being in such case movable along with the axis 105.

That portion of the instrument which has already been referred to as the "probe" is supported by the guide-socket 104, for which purpose the probe is mounted in a carrier which is inserted between the guides 106 and is adjustable lengthwise thereof, or in other words radially with reference to the axis 105. A typical example of a probe is shown in Figs. 3, 4, 13 and 14, which illustrate one designed for use in producing electrolytic lesions within the brain, the probe-carrier being shown separately, in front and rear elevation respectively, in Figs. 13 and 14. The carrier is duplex, comprising on the one hand a rear portion or slide 110 which is received directly in the guides 106 and is adjustable lengthwise thereof in accordance with graduations provided on one edge of the socket 104 as indicated in Fig. 4, and on the other hand a front portion or needle-holder 111 which, again, is received in guides 112 on the slide 110 and is adjustable lengthwise thereof in accordance with graduations provided on the front of the needle-holder as indicated in Fig. 13. The slide 110, when adjusted in the guides 106, is locked in position by means of a wedging-device, which comprises a rod 113 extending lengthwise of the slide and provided at its outer end with a milled-head 114 serving for turning the rod, and also as a handle for the entire carrier; a wedge-shaped piece 115 with which the threaded inner end of the rod 113 engages; and a head 116 on the piece 115 movable through an opening in the back of the slide 110; the rod 113, which is journaled in bearings in the back-portion of the slide, being prevented from moving lengthwise of the latter. On the slide 110 being passed the required distance through the guides 106 (which overlap its edges), the rod 113 is screwed in through a threaded portion of the slide 110 so as to cause the head 116 to be thrust through the opening in the back of the slide, the face of the push-piece being thus caused to contact forcibly with the opposed surface of the guide-socket 104 and hold the slide 110 by friction in the guides. The needle-holder 111 is adjusted lengthwise of the guides 112 on the slide 110 by means of rock-and-pinion gearing comprising a rack 118 on one edge of the needle-holder and a pinion rotatably mounted on the slide and turned by means of a milled-head 119; the adjustment when effected, being made secure by means of a set-screw 120 carried by the slide so as to bear against the edge of the needle-holder.

The so-called "needle" (or operative member of the "probe") comprises, in the example illustrated, a pair of platinum wires (for conveying the electric current) sheathed in a double-barreled glass tube 121 of small cross-sectional area, through whose two bores the respective wires extend so as, while being supported, to be insulated from one another; these wires, indicated at 122 and 123, being capable of adjustment lengthwise of the tube 121 which in turn is clamped to the needle-holder 111 so as to be movable as one therewith relatively to the slide 110. The glass tube 121, whose forward end is slidable through a guide 124 (known as the "stop") on the slide 110, extends parallel with the direction of adjustment of the needle-holder and slide, and is made to coincide throughout its length with what is regarded as the virtual axis of the "probe"; the rear end of the glass tube being for this purpose adjusted transversely of the needle-holder 111 by means of a pair of laterally-movable jaws 125, 126 (carried by the needle-holder) which grip the tube between them and which are controlled by a pair of cam-levers 127, 128. When this lateral adjustment has been effected, the rear end of the glass tube 121 is clamped to the needle-holder by means of a set-screw 129 carried by a bracket 130 on the needle-holder. In order to prevent short-circuiting between the closely-juxtaposed wires 122, 123 before they enter the bores of the glass tube, the needle-holder 111 is formed of insulating material and carries an acutely-tapering wedge 131, also of insulating material, against whose point the rear end of the glass tube is made to bear so that the respective wires, from immediately beyond the tube, are completely separated by the thickness of the wedge. Some distance in rear of the point of the wedge, the respective wires 122, 123 are passed through grooves 132, 133 formed in metal tongues 134, 135 which extend at opposite sides of the wedge 131, said wires being secured by set screws 136, 137; these tongues forming forward prolongations of a pair of metal slides 138, 139, each having a pin-and-slot connection with the needle-holder 111 so as to be adjustable lengthwise of the latter, as indicated at 140, 141. The slides 138, 139 are separately adjusted, so as to enable the extent to which the corresponding wires are protruded beyond the point of the glass tube to be varied, by means of screws 142, 143 extending rearward from the respective slides; these screws passing through brackets 144, 145 on the needle-holder and being drawn lengthwise in either direction at will by means of nuts 146, 147 which engage the brackets. The slides 138, 139 carry screw-terminals 148, 149 for the respective leading-in wires 150, 151, which are connected to the opposite poles of the source of electric current; the circuit being established for each wire through the corresponding slide and tongue, while the circuit is closed between the points of the respective wires 122, 123 through the tissues into which the glass tube 121 is projected.

The slide 110 is of metal, as is also the guide or stop 124 through which the glass tube 121 is slidable, and in cases where (in place of the two wires 122, 123 above described) only a single wire is employed, the circuit may be formed by coupling this single wire to one leading-in wire, and providing a return through the cranium by way of the metal stop 124. In such case this stop would be brought into contact with the cranium, and the return leading-in wire would be attached to a screw-terminal 152 mounted on a block 153 of insulating material fixed to the slide 110, the terminal 152 being electrically connected to the stop by means of a coupling-wire 154. The stop or guide 124 is longitudinally split as shown in Fig. 13 so that, by drawing together the pair of jaws into which it is thus divided, the glass tube 121 may, if desired, be clamped securely after being slid the requisite distance through the guide. For this purpose a clamping-screw 155 is provided, which may also serve, as indicated, as the terminal for the coupling-wire 154 at the inner or stop-end of the latter.

When the electrolytic needle is to be used, the slide 110 is first inserted between the guides 106 of the socket 104 until an index-mark 156 on the edge of the slide registers with the required graduation on the edge of the socket, whereupon the milled-head 114 is turned so as to lock the slide in the socket. The needle-holder 111 (carrying with it the glass tube 121 and wires 122, 123) may then be racked down until the point of the needle projects to the predetermined distance beyond the socket; an index-mark for the adjustment of the needle-holder 111 being provided, not on the slide 110, but on the socket 104, on the edge of which latter (see Figs. 10 and 12) a pointer 157 is so mounted as to overlap the scale provided on the face of the needle-holder. The pointer 157 may itself be made adjustable (lengthwise of the socket 104) in a slot 158 wherein, after adjustment, it is clamped by means of a screw 159. All the adjustments mentioned above are made to agree with the indications afforded by the charts already referred to, the ratio, between the typical measurements given by the charts and the corresponding (but possibly different) measurements required in adjusting the instrument, being determined in accordance with the absolute dimensions of the cranium under treatment, as previously stated. In order that these absolute dimensions may be ascertained with accuracy, a preliminary gaging of the cranium, on its longitudinal, transverse, and vertical diameters, is effected preferably by means of the device illustrated in Figs. 15 and 16. This device, which is used as soon as the head-vise and cage have been secured in proper position about the cranium, is applied to the head from each of its four sides, anterior and posterior and lateral, and also from the top, in succession, the dimensions of the cranium being taken on the several zero-planes, or on planes bearing a known relation to the zero-planes.

The gaging-device comprises a needle 160 adapted to pierce the skin and tissues covering the cranium so as to take a bearing against, and give measurements directly from, the surface of the bone. The needle 160 is fixed at the inner end of a stem 161 adjustable in the direction of its own length through an opening provided in a slide-block 162 which in turn is adjustable lengthwise of a horizontal bar 163 extending at right angles to the stem 161. The bar 163 rests in bearings 164 at the outer ends of a pair of brackets 165 whose inner ends 166 are adapted to be hooked from opposite directions around any two adjacent corner-posts 34 or pair of opposite bars 32 or 33 of the cage, the hooked inner ends 166 of the brackets fitting closely against three sides of each post or bar as indicated in Fig. 15 so as to be supported by frictional or wedging-contact therewith. The horizontal bar 163 may be marked or graduated to enable the slide-block 162 to be so adjusted upon the bar as to bring the axis of the gaging-needle 160 into coincidence with the sagittal, frontal, or horizontal zero-plane as the case may be, while the stem 161 is graduated to show the distance of the point of the needle 160 from the particular zero-plane to which the needle itself is for the time being perpendicular. Set-screws 167 are provided for fixing the bar 163 in the bearings 164, and a set-screw 168 serves to fix the slide-block 162 upon the bar 163. In the example illustrated, the slide-block has a removable cover 169 held in position by a screwed stud 170 fixed to the block and passing through the cover, which is forced down upon the block by a nut 171 so as to clamp the graduated stem 161 to the block 162 after adjustment. An adjustable zero-pointer or index 172 may be provided for use in reading the graduations on the stem 161, this index being carried on the outer end of a rod 173 which is slidable through the block 162 in a direction parallel to the stem 161 and is clamped in position, after adjustment, by means of a set-screw 174.

Claims:

1. Stereotaxic apparatus for use in performing surgical operations within the cranium, comprising three self-contained and mutually-separable parts, namely, a so-called head-vise serving for adjusting and holding the cranium and the instrument as a whole in the required position relatively to one another; a so-called rectangular frame or cage adapted to be fixed in predetermined position upon the head-vise; and a stage adapted to be fixed in either of several predetermined positions on the rectangular frame at will, and carrying a compound slide-rest provided with means for adjustably supporting the so-called probe, substantially as described.

2. In a surgical apparatus of the kind specified, a head-vise comprising a pair of parallel side-rails, means for securing the same together at a fixed distance apart, means for supporting said rails and means mounted upon and adjustable transversely of said rails for locating and securing a cranium thereto in the required relative position, substantially as described.

3. In a surgical apparatus of the kind specified, a head-vise comprising a pair of parallel side rails secured together at a fixed distance apart, means for supporting said rails, adjustable means mounted upon said rails for locating the inter-aural axis of a cranuim and adjustable means adjustably mounted upon said rails for securing the cranium in the required relative position, substantially as described.

4. In a surgical apparatus of the kind specified, a head-vise comprising a pair of parallel side-rails secured together at a fixed distance apart, adjustable means mounted upon said rails for locating the inter-aural axis of a cranium, and means coöperating with the orbits of the cranium for positioning the latter so that the orbital plane, through the inter-aural axis, shall coincide with or be parallel to the plane of said side rails, substantially as described.

5. In a surgical apparatus of the kind specified, a head-vise comprising a pair of parallel side-rails secured together at a fixed distance apart, adjustable means mounted upon said rails for locating the interaural axis of a cranium, means coöperating with the orbits of the cranium for positioning the latter so that the orbital plane, through the inter-aural axis, shall coincide with or be parallel to the plane of said side rails, and a bit operating in conjunction with said last named means for clamping the cranium in the desired position, substantially as described.

6. In a surgical apparatus of the kind specified, a head-vise comprising a pair of parallel side-rails secured together at a fixed distance apart, means connected therewith for determining an orbital plane through the inter-aural axis of a cranium and locating it parallel to the plane of said rails, and adjustable head-cramps supported upon said rails and adapted to be brought into forcible engagement with the sides of the cranium for securing the same in the desired position, substantially as described.

7. In a surgical apparatus of the kind specified, a head-vise comprising a pair of parallel side-rails secured together at a fixed distance apart, means connected therewith for locating and securing a cranium thereto in such position that the orbital plane through the inter-aural axis of the cranium shall be parallel to the plane of said rails, and an occipital bar adapted to be brought into contact with the back of the cranium and adjustably clamped to said side rails, substantially as described.

8. In a surgical apparatus of the kind specified, a head-vise comprising a pair of parallel side-rails secured together at a fixed distance apart, means carried thereby for locating and securing a cranium thereto in a predetermined relative position and a rectangular cage, adapted to surround the cranium, comprising a rectangular open frame provided with depending posts adapted to be supported upon and secured to said side rails, substantially as described.

9. In a surgical apparatus of the kind specified, a head-vise comprising a pair of parallel side-rails secured together at a fixed distance apart, means carried thereby for locating and securing a cranium thereto in a predetermined relative position, a rectangular cage supported upon and secured to said side-rails and a stage carrying a compound slide-rest, adapted to be secured to said cage on any desired face thereof according to the part of the cranium to be worked upon, substantially as described.

10. In a surgical apparatus of the kind specified a head-vise comprising a pair of parallel side-rails secured together at a fixed distance apart, means carried thereby for locating and securing a cranium thereto in a predetermined relative position, a rectangular cage supported upon and secured to said side-rails, a stage adapted to be secured to any desired face of said rectangular cage and carrying a compound slide-rest, a probe and means carried upon said slide-rest permitting angular and longitudinal adjustment of said probe and for securing the same in any desired position relative to the cranium, substantially as described.

11. In a surgical apparatus of the kind specified a head-vise comprising a pair of parallel side-rails secured together at a fixed distance apart, means carried thereby for locating and securing a cranium thereto in a predetermined relative position, a rectangular cage supported upon and secured to said side-rails, a stage adapted to be secured to any desired face of said rectangular cage and carrying a compound slide-rest, a probe, means carried upon said slide-rest permitting angular and longitudinal adjustment of said probe and for securing the same in any desired position relative to the cranium, and means carried by said probe for producing electrolytic lesions within the brain, substantially as described.

12. In a surgical apparatus of the kind specified, a head-vise comprising a pair of parallel side-rails secured together at a fixed distance apart, means carried thereby for locating and securing a cranium thereto in a predetermined relative position, a rectangular cage supported upon and secured to said side-rails and adjustable means adapted to be temporarily secured to said cage on any face thereof for gaging the cranium according to predetermined standards, substantially as described.

ROBERT HENRY CLARKE.

Witnesses:
GEORGE ERNEST MINTERN,
WILLIAM GEORGE ELLIS DAVIES.

Copies of this patent may be obtained for five cents each, by addressing the "Commissioner of Patents, Washington, D. C."